United States Patent [19]

Fukuda et al.

[11] Patent Number: 5,121,439
[45] Date of Patent: Jun. 9, 1992

[54] IMAGE PROCESSOR FOR DETECTING INCOMPLETE ARTICLES SUCH AS WIRING HARNESSES

[75] Inventors: Michio Fukuda, Hyogo; Tsutomu Iida; Yoshihide Ichikawa, both of Mie; Kiyohide Abe, Aichi; Hiroshi Igura, Kanagawa; Tsuneyoshi Takahashi, Aichi; Isao Kashihara, Kanagawa, all of Japan

[73] Assignee: Sumitomo Wiring System, Ltd., Mie, Japan

[21] Appl. No.: 393,763

[22] Filed: Aug. 14, 1989

[30] Foreign Application Priority Data

Aug. 12, 1988 [JP] Japan ............... 63-105998[U]
Aug. 12, 1988 [JP] Japan ............... 63-105999[U]
Aug. 12, 1988 [JP] Japan ............... 63-200145
May 2, 1989 [JP] Japan ............... 1-111981

[51] Int. Cl.$^5$ .............. G06K 9/00; H04N 7/00; G01N 21/86; G01V 9/04
[52] U.S. Cl. .............. 382/8; 382/18; 358/101; 250/561; 29/705; 269/903
[58] Field of Search ............... 382/8, 18, 28; 358/101; 250/559, 561; 362/31; 242/129; 29/755, 705; 269/296, 903

[56] References Cited

U.S. PATENT DOCUMENTS

| | | | |
|---|---|---|---|
| 3,909,602 | 9/1975 | Micka | 250/563 |
| 4,209,830 | 6/1980 | Arimura et al. | 364/490 |
| 4,337,934 | 7/1982 | Caveny | 269/903 |
| 4,549,087 | 10/1985 | Duncen et al. | 382/8 |
| 4,578,810 | 3/1986 | MacFarlane et al. | 382/8 |
| 4,729,068 | 3/1988 | Ohe | 362/31 |
| 4,745,296 | 5/1988 | Driller et al. | 382/8 |
| 4,783,827 | 11/1988 | Izumi | 382/18 |
| 4,805,123 | 2/1989 | Specht et al. | 382/8 |
| 4,809,308 | 2/1989 | Adams et al. | 382/8 |
| 4,877,228 | 10/1989 | Ripert | 269/903 |
| 4,926,489 | 5/1990 | Danielson et al. | 382/8 |

FOREIGN PATENT DOCUMENTS 0124113 11/1984 European Pat. Off. .

OTHER PUBLICATIONS

Sawada Seiichi; "Still Picture Camera for Object Inspection"; Patent Abstracts of Japan; vol. 12, No. 277 (E-640).

Bessho Yoshinori; "Shape Inspecting Apparatus"; Patent Abstracts of Japan, vol. 11, No. 019 (P-537).

Primary Examiner—David K. Moore
Assistant Examiner—Michael R. Cammarata
Attorney, Agent, or Firm—Wenderoth, Lind & Ponack

[57] ABSTRACT

In an image processor for detecting incomplete articles the image of a complete article is produced by a television camera so as to record the image, and the operator designates an area of the complete article that is considered to be essential in judging whether or not the subject of the inspection is complete while observing the reproduced image. Following this, the image of an inspection article is produced by another television camera. The video signals are binarized, and the number of the picture elements of the inspection article within the designated area is then counted. The inspection article is judged as being incomplete when this counted value fails to conform to the reference value obtained by statistically processing the number of the picture elements of the complete article.

4 Claims, 12 Drawing Sheets

IMAGE PROCESSOR FOR DETECTING INCOMPLETE ARTICLES SUCH AS WIRING HARNESSES

BACKGROUND OF THE INVENTION

1. Field of the Invention

The present invention relates to an image processor for detecting incomplete articles, and more particularly to an image processor for detecting incomplete articles which is suitable for distinguishing complete from incomplete articles having complicated configurations, especially for inspecting articles for a lack of parts.

2. Statement of the Prior Art

Wire harnesses used in automobiles may be taken as an example of articles having complicated configurations.

Electrical equipment of various types are used in an automobile, and those having a relatively low electrical capacity are used in illumination, signalling, controlling, warning, charging and instrumentation systems, as well as for wind screen wipers.

The wiring for connecting this electrical equipment to a power supply is assembled on the relevant parts during one stage of an assembly line, and wire harnesses are components that are previously manufactured in such a manner as to enable such an assembly to be accomplished in a smooth fashion efficiently. Wire harnesses are formed from a number of electrical wires that are bundled together by utilizing vinyl tape or the like after being cut to predetermined lengths and harness parts (tubes, crampers, grommets, protectors, taping and so forth) which are mounted on the electrical wires.

Wire harnesses are normally produced by accurately placing bundled electrical wires on a plate with a representative drawing (plate on which a drawing showing how to assemble the relevant parts is placed thereon) and then mounting the necessary parts on the required portions of the bundled electrical wires while feeding the plate with a representative drawing forward on a production line.

Wire harnesses so assembled are then inspected for a lack of the necessary parts, and wire harnesses in which a lack of parts are found are rejected as incomplete articles.

Conventionally, visual inspection for a lack of parts in the articles has been done by eyesight. More recently visual inspection utilizing an image processing means has also been introduced to enhance the efficiency of the operation.

A conventional method of visually inspecting articles for a lack of parts thereof by utilizing an image processing means is described in FIG. 13 showing a schematic diagram of the constitution of a prior art image processor for detecting incomplete articles.

As seen from FIG. 13, a wire harness 1 is set on a plate with a representative drawing 2 that is adapted to travel in a direction shown by reference arrow A. Reference numeral 1a denotes a bundle of electric wires, and 1b denotes harness parts. The wire harness 1 and plate with a representative drawing 2 are imaged by an industrial camera 3, and video signals are sent to an image processor 4. This image processor 4 incorporates a television camera interface and a micro computer. The surface area of the plate with a representative drawing 2 is divided into a plurality of imaging regions each coinciding with the imaging field of the television camera 3, for instance, into four imaging regions divided by chain lines and designated by, respectively, reference numerals I, II, III and IV in the same figure. The video signals of the television camera 3 are sent to the image processor 4 every time the imaging field of the television camera 3 coincides with the respective imaging regions.

Images showing positions on which individual harness parts are normally placed and the normal configurations of the individual parts are registered in the image processor 4 via a terminal 5 (including a keyboard and a CRT), and this registration of images is conducted for the respective imaging regions. The image processor 4 has a monitor 6 connected thereto.

The image processor 4 detects the positions and configurations of the individual parts 1b of the wire harness 1 being inspected on the basis of the video signals sent thereinto and compares the detected actual positions and configurations with those of the registered images, thereby judging whether or not the individual necessary parts 1b are properly mounted on the wire harness.

Conducting a visual inspection of articles for a lack of parts by eyesight tends to exhaust the inspecting personnel, and also tends to be inaccurate.

The prior art visual inspection method utilizing an image processing means requires the normal positions and configurations of all of the harness parts 1b to be imaged so as to be registered. In order to successfully accomplish the image processing visual inspection, a tremendous amount of data must be registered and hence this requires an inordinately long period of time. In addition to this, a certain amount of time is required to complete the detection of the positions and configurations of the harness parts of the wire harness being inspected, and it is difficult to accurately detect the positions and configurations of the parts. Due to the above reasons, it is not possible to conduct an inspection simply and quickly with the prior art image processor.

In distinguishing complete articles from incomplete ones, reference values are normally provided in advance, and in the event of the detected values with respect to a product being inspected falling within the upper and lower limits of the reference value, the product is then judged as being complete. On the contrary, in the event of the detected values being smaller or greater than the lower or upper limits, respectively, the product is then judged as being incomplete. It may be easy to set reference values if there are only a few factors which the reference values govern. In the case of parts like wire harnesses which embody a wide variety of configurations and dimensions, the number of counted picture elements of a binarized image scatters even with a product judged to be a complete product. In addition, there are a number of different items to be inspected, and this makes it difficult to set accurate reference values to ensure a complete product and requires a tremendous amount of labor.

Referring further to FIG. 13, in a case where the wire harness 1 being inspected is long, it is hard to accurately locate the wire harness 1 under the industrial camera 3 by utilizing the technology shown and employed in the same figure. Moreover, the plate with a representative drawing 2 tends to slip from its initial position while being fed in the direction shown by reference arrow A, and once such a slippage occurs, it is not possible to make accurate judgements.

Furthermore, it is a well known fact that the lighting has a great effect on the results of an inspection when inspecting wire harnesses or the like by utilizing an image processing means. Therefore, the subject of the inspection must be illuminated in such a way as to allow it to clearly stand out against its background.

In order to accomplish such a way of lighting, a method in which the subject of the inspection is illuminated by transmitted light has generally been employed, and in this case, the subject in silhouette is imaged by means of a television camera disposed in front thereof.

However, transmitted light is not always usable due to external conditions. In a case where it is not possible to use transmitted light, the subject of the inspection is placed on a white board, and a light is also disposed in front of the subject as in the case of the television camera for illuminating the subject from the front thereof. The television camera is then allowed to image the brightly lit subject.

In this conventional technology, however, unnecessary shadows are produced on the white board since the subject is lit from the front thereof. In addition, in a case where there are patterns or characters on the white board, it is not possible to allow the subject to clearly stand out against the background without interference from these patterns or characters since they cannot be erased.

SUMMARY OF THE INVENTION

An object of the present invention is, in view of the defects inherent in the above-mentioned prior art visual inspection methods, to provide an image processor for detecting incomplete articles that is capable of automatically and accurately performing a simple and quick inspection of articles for a lack of parts thereof without conducting a visual inspection by eyesight.

Another object of the present invention is to provide an image processor for detecting incomplete articles that is capable of automatically calculating reference values by statistically processing a number of data with respect to a product of good quality so as to improve the efficiency as well as the accuracy of the inspection.

A further object of the present invention is to provide an image processor for detecting incomplete articles having a positional slippage compensating function in which even when a certain amount of slippage of the subject of the inspection occurs, the image processor functions to compensate for such a slippage so as to enable an accurate judgement.

A still further object of the present invention is to provide an image processor for detecting incomplete articles having a dummy transmitted light-type lighting device that is capable of allowing only the subject of the inspection to stand out without using transmitted light to substantially the same extent as that effected when transmitted light is used.

In an image processor for detecting incomplete articles according to the present invention, an article representing a complete product and an article to be inspected are separately imaged by different television cameras, and video signals from these television cameras are binarized. The number of picture elements representing a complete article is compared with that of picture elements representing an inspection article, and when a difference in the numbers of the relevant picture elements is present, the inspection article is judged as being incomplete.

To be more specific, in the image processor according to the present invention, video signals sent from a television camera for producing the image of a complete article are binarized so as to be divided into picture element signals representing a complete article and picture element signals representing the conditions of the background. The number of picture elements representing a complete article is then counted. Video signals sent from a television camera for producing the image of an article to be inspected are binarized so as to be divided into picture element signals representing an inspection article and picture element signals representing the conditions of the background. The number of picture elements representing an inspection article is then counted. Afterwards the counted value of the picture elements representing a complete article is compared with that of the picture elements representing an inspection article, and in the event that the resulting difference is greater than the set value, the inspection article is then judged as being incomplete.

In an image processor for detecting incomplete articles of another type according to the present invention, the image of a complete article is first produced by means of the television camera and is then recorded. An operator observes a reproduced image to designate a narrow area including portions essential to the distinguishment of complete articles from incomplete ones. Following this, the image of an inspection article is produced by the television camera. The video signals sent from the camera are then binarized, and the number of the picture elements of the inspection article in the designated area is counted. When the counted value does not coincide with the reference value previously obtained by statistically processing the number of picture elements representing a complete article, the inspection article is then judged as being incomplete.

To be more specific, the image processor for detecting incomplete articles according to the present invention comprises television cameras for producing the image of the inspection articles, an image processor for receiving the video signals from the television cameras so as to judge whether the inspection articles are complete or incomplete, a video tape recorder for recording the video signals sent from the cameras, a monitor for receiving the reproduced signals sent from the video tape recorder so as to display images and an area designating device for designating an area in the monitor. The image processor of the present invention further comprises a binarizing section for dividing the video signals from the television cameras into the picture elements representing the background and those representing the inspection articles, a counting section for counting the number of the picture elements representing an inspection article in the area designated on the area designating device, a memory for storing the reference values and a judging section for comparing the counted values obtained at the counting section with the reference values so as to judge the inspection articles as being incomplete when their counted values do not coincide with the stored reference values.

An image processor for detecting incomplete articles of a further type according to the present invention is provided with a positional slippage compensating device for shifting a region where data processing is to be conducted in accordance with the slippage of position compensating marks disposed along the subject of the inspection at regular intervals when the position compensating marks are caused to slip from their initial positions inside the image processor in judging whether or not the subject of the inspection is complete by processing in the image processor the data of video signals obtained by producing the image of the subject of the inspection by a television camera.

In this positional slippage compensating device, position compensating marks are disposed at regular intervals with a predetermined positional relationship with respect to the subject of the inspection being maintained, and the image processor is provided with a position compensating window for detecting the position of the position compensating marks and an inspection window for determining a region where data processing is conducted for judging whether or not the subject of the inspection is complete. In this construction, when the displacement of the position compensating mark is detected within one image plane through the position compensating window, the position of the position compensating window is shifted by a distance equal to the displacement of the position compensating mark.

An image processor for detecting incomplete articles of a still further type according to the present invention is provided with a dummy transmitted light-type lighting device comprising a base plate, which may be colored in any colors except black, hooded fluorescent lights disposed, respectively, at the sides of the base plate so as to light the base plate from thereabove in a substantially parallel direction with respect to the same and a support for supporting the subject of the inspection at a position above the hoods of the fluorescent lights, wherein the base plate is allowed to function as a bright background on which the shadows of the subject and support are not present and which is not influenced by characters or the like, thereby allowing the subject of the inspection to stand out in silhouette without the same being suspended in the air so as to be lighted from the front thereof.

DETAILED DESCRIPTION OF THE PREFERRED EMBODIMENT

Figure 1:
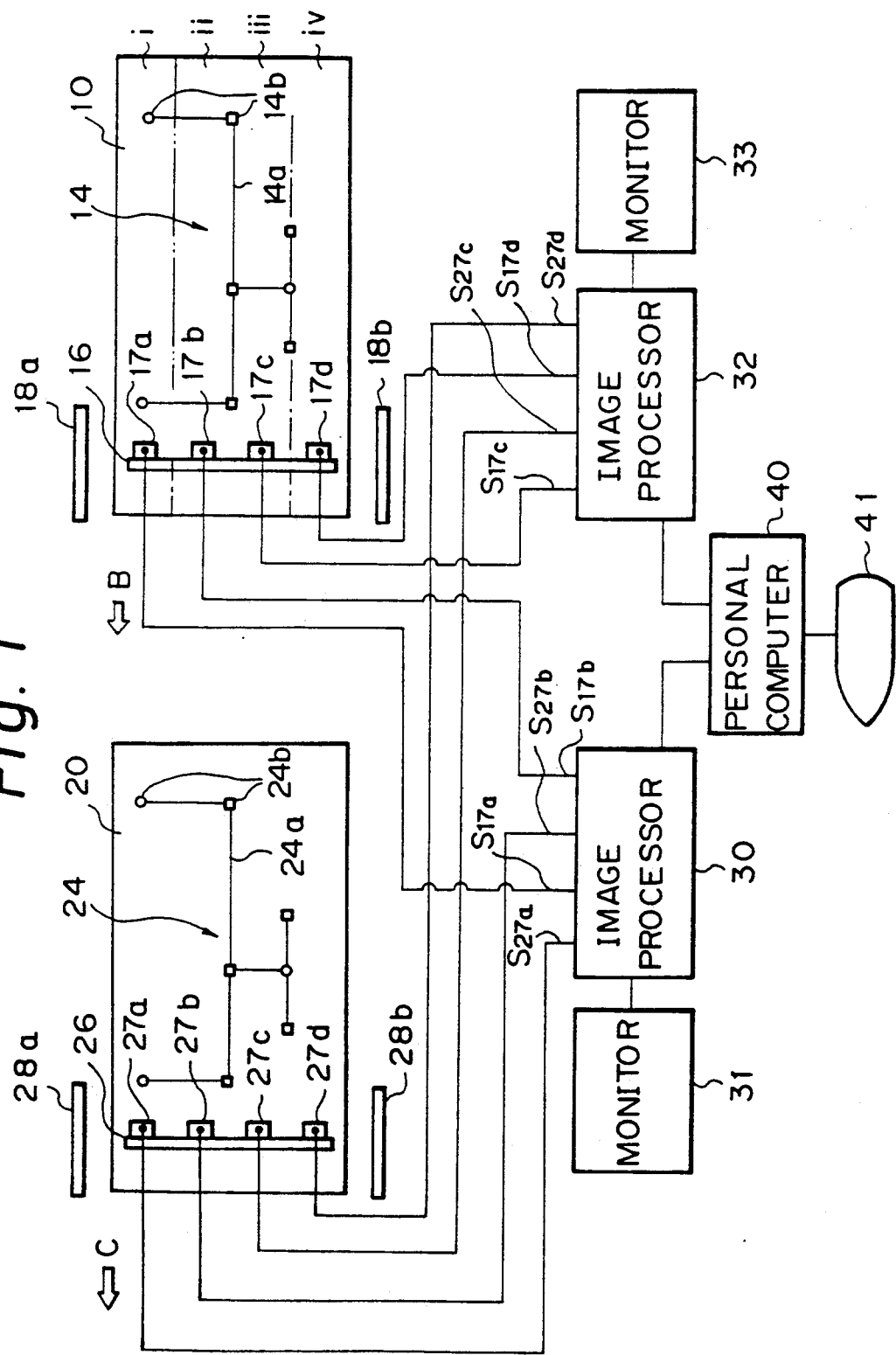
FIG. 1 is a system diagram showing a system according to a first embodiment of the present invention.
Figure 2:
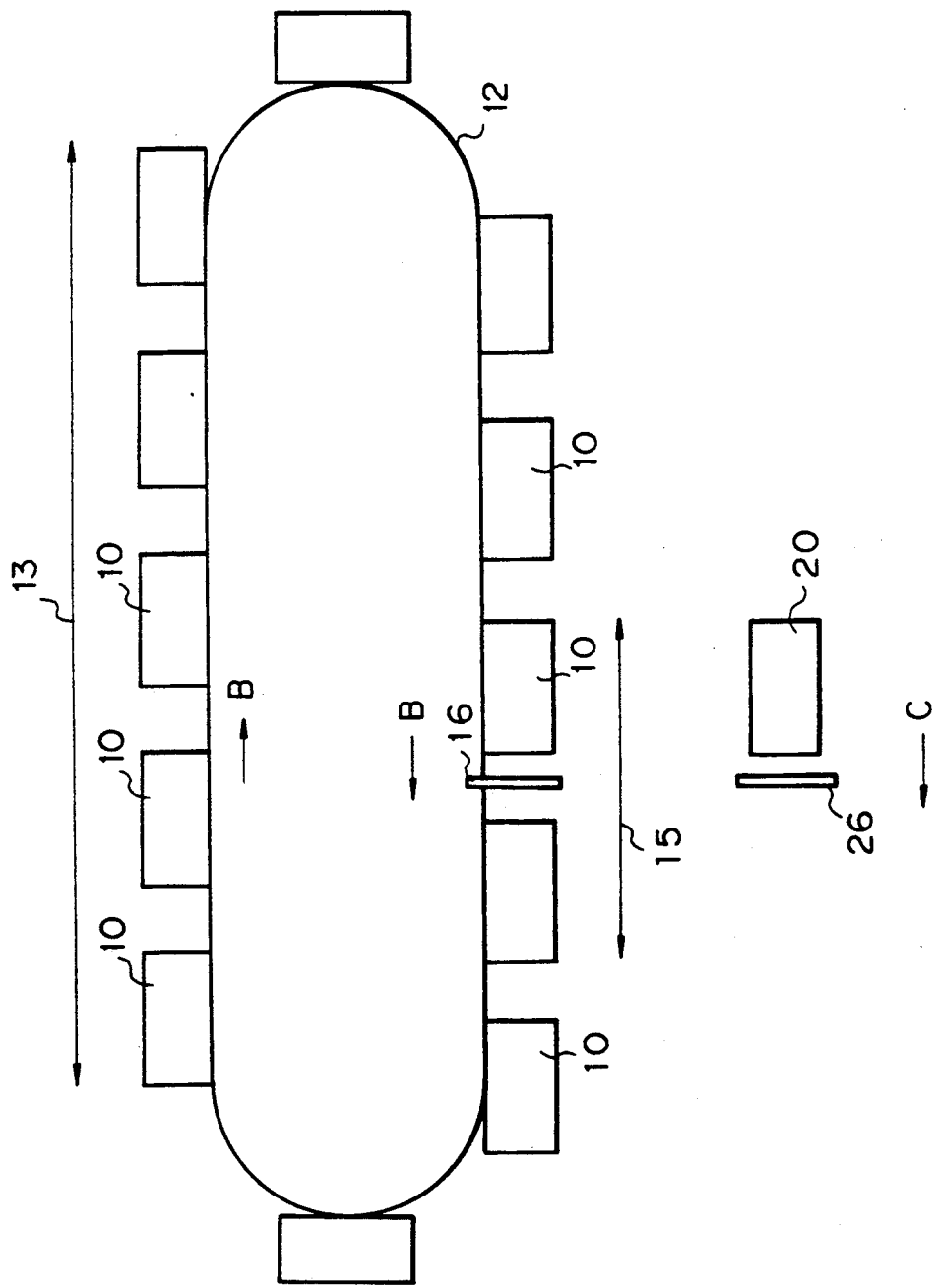
FIG. 2 is a plan view showing a conveyer line for a plate with a representative drawing.
Figure 3:
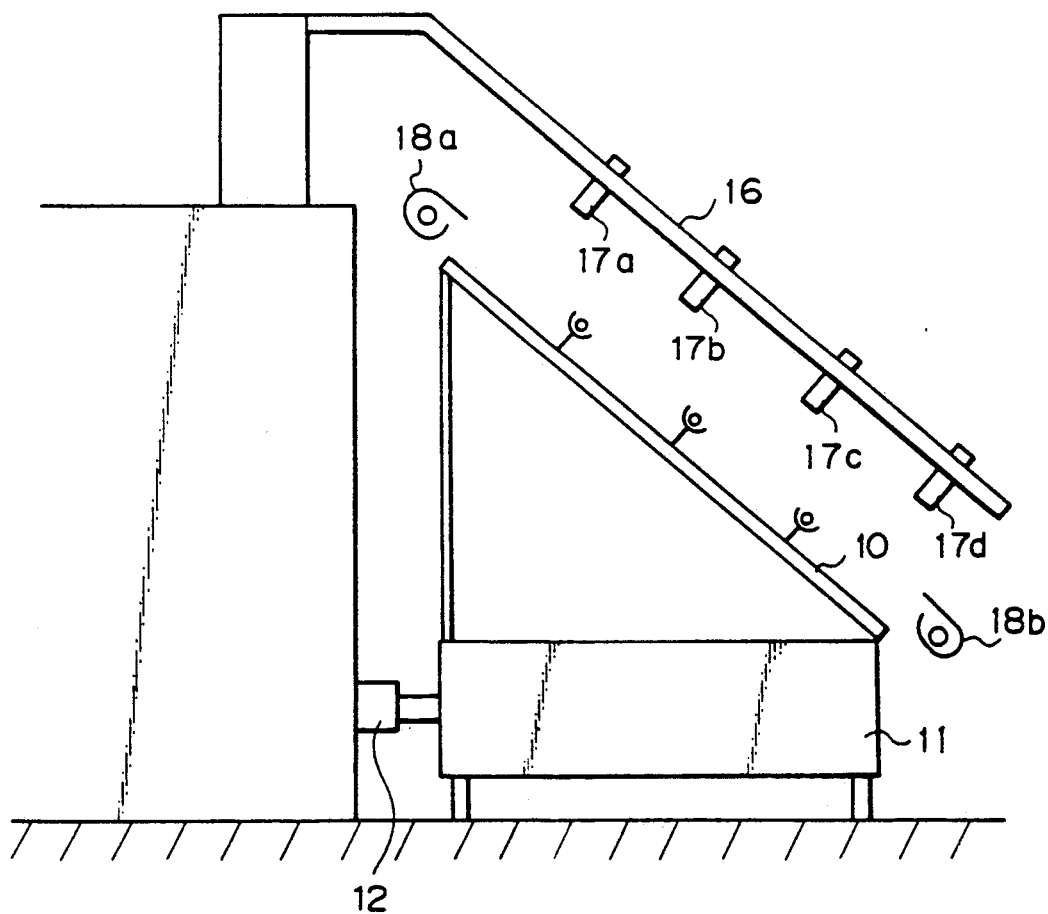
FIG. 3 is a constitution diagram showing a state in which the plate with a representative drawing is conveyed.

Referring to FIGS. 1 to 3, a first embodiment of an image processor for detecting incomplete articles according to the present invention will now be described. FIG. 1 is a schematic diagram showing the constitution of the image processor according to the first embodiment. FIG. 2 shows a conveyer line for a plate with a representative drawing (plate on which a drawing showing how to assemble the relevant parts is attached), and FIG. 3 shows a state in which the plate with a representative drawing is being conveyed.

As shown in FIG. 3, the plate with a representative drawing 10 is placed on a carriage 11 in an inclined fashion, and this carriage is adapted to travel along a guide rail 12. As shown in FIG. 2, therefore, the plate with a representative drawing 10 is fed in directions shown by reference arrow B so as to circulate in such directions. A wire harness 14 (refer to FIG. 1) is assembled by mounting thereon bundled electrical wires 14a and harness parts 14b on the plate with a representative drawing while it is caused to travel along an assembly line 13. The wire harness 14 so assembled is then inspected on an inspection line 15. When the wire harness 14 passes the inspection, it is then removed from the plate with a representative drawing 10, which is then caused to return to the assembly line 13.

As shown in FIGS. 1 to 3, a supporting section 16 is provided in an inclined fashion above a plate feeding section in the inspection line 15, and provided on this supporting section 16 are four industrial television cameras (for the inspection purpose) 17a, 17b, 17c and 17d which are designed to produce the images of what exists in their imaging fields which are regions lying in an oblique direction under the supporting section 16. These imaging fields are illuminated by means of light sources (fluorescent lights) 18a, 18b.

The wire harness 14 constituted by the bundled electrical wires 14a and harness parts 14b is set on the white plate with a representative drawing 10 for inspection. The color of the bundled electrical wires 14a is black, and that of the harness parts 14b may be any colors except white (for instance, blue or red). The plate with a representative drawing 10 is fed in the direction shown by reference arrow B directly under the television cameras 17a, 17b, 17c and 17d, and in this construction, therefore, the image of the plate with a representative drawing 10 is allowed to be produced by these television cameras 17a, 17b, 17c and 17d from the right-hand end to the left-hand end thereof.

A support section 26 is, as shown in FIGS. 1 and 2, provided in an inclined fashion at a position away from the support section 16, and provided on this supporting section 26 are four industrial television cameras (for producing the image of complete articles) 27a, 27b, 27c and 27d which are designed to produce the images of what exist in their imaging fields which are regions lying in an oblique direction under the supporting section 26. These imaging fields are illuminated by means of light sources (fluorescent lights) 28a, 28b.

A wire harness 24 is set on a white plate with a representative drawing 20, and it is confirmed that the necessary harness parts 24b are accurately mounted on a bundle of electrical wires 24a which is in turn mounted on this wire harness 24. The color of the bundled electrical wires 24a is black, and that of the harness parts 24b may be any colors except white (for instance, blue or red). The plate with a representative drawing 20 is placed on a carriage (not shown) so as to be fed in the direction shown by reference arrow C directly under the television cameras 27a, 27b, 27c and 27d, and in this construction, therefore, the image of the plate with a representative drawing 20 is allowed to be produced by these television cameras 27a, 27b, 27c and 27d from the right-hand end to the left-hand end thereof.

The imaging fields (areas where images can be produced) of the television cameras 17a, 17b, 17c and 17d coincide with those of the television cameras 27a, 27b, 27c and 27d, respectively, and the intensity of illumination realized on the plate with a representative drawing 10 by the respective light sources 18a, 18b is made equal to that realized on the plate with a representative drawing 20 by the light sources 28a, 28b.

The carriages are designed to travel in such a manner that the relative movement of the plate with a representative drawing 10 and the television cameras 17a, 17b, 17c and 17d coincide with that of the plate with a representative drawing 20 and the television cameras 27a, 27b, 27c and 27d. In other words, an arrangement is made such that when the left-hand end of the plate with a representative drawing 10 is brought to a position right under the television cameras 17a, 17b, 17c and 17d, the left-hand end of the plate with a representative drawing 20 is also brought to a position right under the television cameras 27a, 27b, 27c and 27d. Thus, after the positioning of the respective plates has been completed as described above, the carriages on which the plates of the representative drawings 10, 20 are placed, respectively, are caused to travel in the directions shown by reference arrows B and C, respectively, at the same speed.

As shown in FIG. 1, video signals S27a, S27b, S17a and S17b are sent from the respective television cameras 27a, 27b, 17a and 17b to an image processor 30. This image processor 30 binarizes these video signals S27a, S27b, S17a and S17b so as to divide them into black picture element signals representing the wire harnesses 24 and 14 and picture element signals representing the plates with representing drawings 20 and 10, and these picture element signals are stored therein.

The image processor 30 then counts the number of the picture elements of the black picture elements signals of the binarized video signals S27a and S17a and compares the respective counted values with each other, while it counts the number of the picture elements of the black picture element signals of the binarized video signals S27b and S17b and compares the respective counted values with each other. In the event of the resulting differences exceeding predetermined set values (which are determined depending on the amount of scatter of the size of the harness parts), the image processor 30 judges that some of the harness parts 14b are missing. The images produced by the television cameras 27a, 27b, 17a and 17b are displayed on a monitor 31.

Video signals S27c, S27d, S17c and S17d are sent from the respective television cameras 27c, 27d, 17c and 17d to an image processor 32. This image processor 32 binarizes these video signals S27c, S27d, S17c and S17d so as to divide them into black picture element signals representing the wire harnesses 24 and 14 and picture element signals representing the plates with representing drawings 20 and 10, and these picture element signals are stored therein.

The image processor 32 then counts the number of the picture elements of the black picture element signals of the binarized video signals S27c and S17c and compares the respective counted values with each other, while it counts the number of the picture elements of the black picture element signals of the binarized video signals S27d and S17d and compares the respective counted values with each other. In the event of the resulting differences exceeding predetermined set values, the image processor 32 judges that some of the harness parts 14b are missing. The images produced by the television cameras 27c, 27d, 17c and 17d are displayed on a monitor 33.

A personal computer 40 is designed to display on a display device 41 the results of the judgements made by the image processors 30, 32 when these image processors judges some of the parts of the wire harness 14 are missing.

With the above described image processor for detecting incomplete articles, a failure to mount a harness part on the wire harness can be detected even when such a failure occurs in any of the four imaging regions i, ii, iii, iv on the plate with a representative drawing 10 the images of which are produced by the television cameras 17a, 17b, 17c and 17d, respectively. For instance, in a case where a lack of parts occurs in the imaging region i, there is a large difference in the number of the black picture elements of the picture element signals S27a and S17a, and in a case where a lack of part occurs in the imaging region ii, there is a large difference in the number of the black picture elements of the video signals S27b and S17b, and the image processor 30 then judges that a lack of parts are occurring. On the other hand, in a case where a lack of parts occurs in the imaging region iii, there is a large difference in the number of the black picture elements of the video signals S27c and S17c, and in a case where a lack of parts occurs in the imaging region iv, there is a large difference in the number of the black picture elements of the video signals S27d and S17d, the image processor 32 then judges that a lack of parts are occurring.

A wire harness 14 in which a lack of parts is detected is then repaired.

When the inspection of one wire harness has been completed, another plate with a representative drawing 10 on which a wire harness is set is arranged to be brought to a position where the left-hand end thereof lies right under the television cameras 17a, 17b, 17c and 17d, while the plate with a representative drawing 20 is returned to its initial position where the left-hand end thereof lies right under the television cameras 27a, 27b, 27c and 27d. When such positioning has been completed, an inspection of another wire harness 14 is conducted in the same manner as that described above.

In this embodiment, a lack of parts is judged simply by comparing the binarized areas, i.e. comparing the number of the black picture elements representing the wire harness 24 which is complete with the number of the black picture elements representing the wire harness 14 which is the subject of the inspection. Therefore, the image processors 30, 32 only conduct simple processing operations such as binarization, comparison and so forth, and this allows the image processors 30, 32 to perform their duties at an extremely high speed, thus making it possible to move the respective plates with the representative drawings 10, 20 at a high speed, thus improving the efficiency of the inspection.

This embodiment may be used to inspect for a lack of parts in inspection articles other than wire harnesses. In such a case, no matter how complicated the configurations of the inspection articles are, or no matter how difficult it is to detect individual parts of the articles, there will be no difficulty in performing an inspection for a lack of parts since a lack of parts is detected by comparing the relevant areas. In addition, no specific teaching is needed.

Next, referring to FIGS. 4 to 10, a second embodiment of the image processor for detecting incomplete articles according to the present invention will be described.

Figure 4:
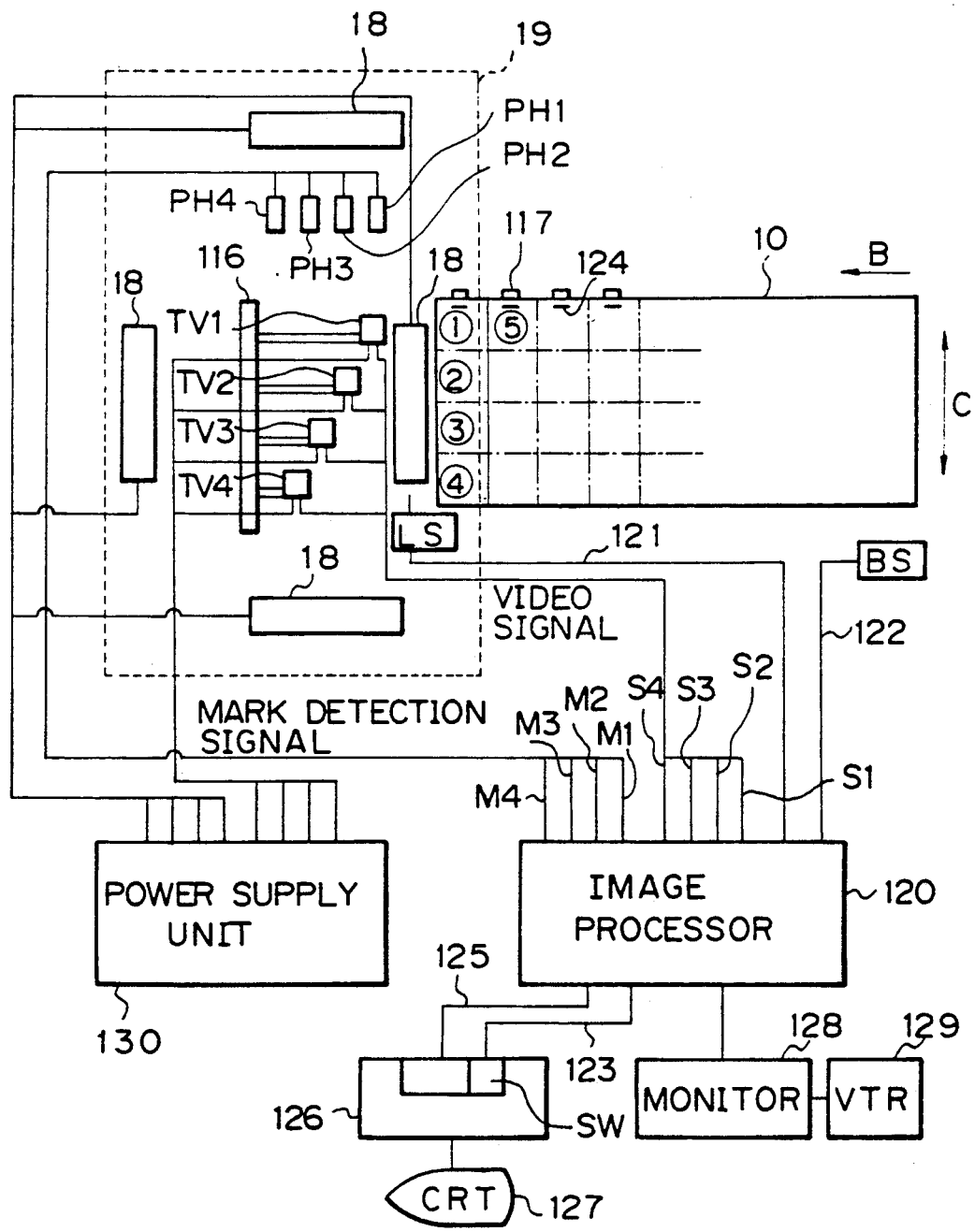
FIG. 4 is a system diagram showing a system according to a second embodiment of the present invention.

FIG. 4 is a schematic diagram showing the constitution of the second embodiment. As shown in FIG. 4, the television cameras used in this embodiment are four industrial television cameras TV1, TV2, TV3 and TV4 which are capable of improving the resolution in accordance with the size of the articles. As shown in FIGS. 4, 2, and 3, the support member 16 is provided in an inclined fashion above the plate with a representative drawing 10 on the inspection line 15, and the four television cameras TV1, TV2, TV3 and TV4 are provided on this support member 16 in such a manner as to face the plate with a representative drawing 10. Although the imaging fields of the respective television cameras are designed to be adjusted in accordance with the accuracy of the inspection required, since they are set such as to be narrower than the plate with a representative drawing 10, the television cameras are allowed to cover the plate with a representative drawing 10 in a lengthwise direction by shifting their imaging fields in a direction C that is normal to a direction B in which the plate with a representative drawing 10 is fed.

Marks 117 are provided on the plate with a representative drawing 10 in a widthwise direction thereof at regular intervals (for instance intervals of 200 mm) in such a manner as to cover the plate 10 in such a direction, and an image processor 120 is designed to receive the video signals, as still pictures, from the television cameras every time the marks 117 are detected by a photoelectric sensor or the like provided at a certain position along the length of the inspection line 15. In addition, the television cameras TV1 to TV4 are provided in such a manner as that they are positioned in relation to each other by, for instance, 50 mm in the direction B so that image processing is performed by each television camera in order, and four sensors PH1, PH2, PH3 and PH4 are provided in the same manner as in the case of the television cameras, i.e. they are also positioned in relation to each other by 50 mm so as to correspond to the respective television cameras. A limit switch LS is provided at a position along the length of the inspection line 15, whereby a start command is sent to the image processor 120 after the arrival of the plate with a representative drawing 10 at the inspection line 15 has been detected.

Figure 7:
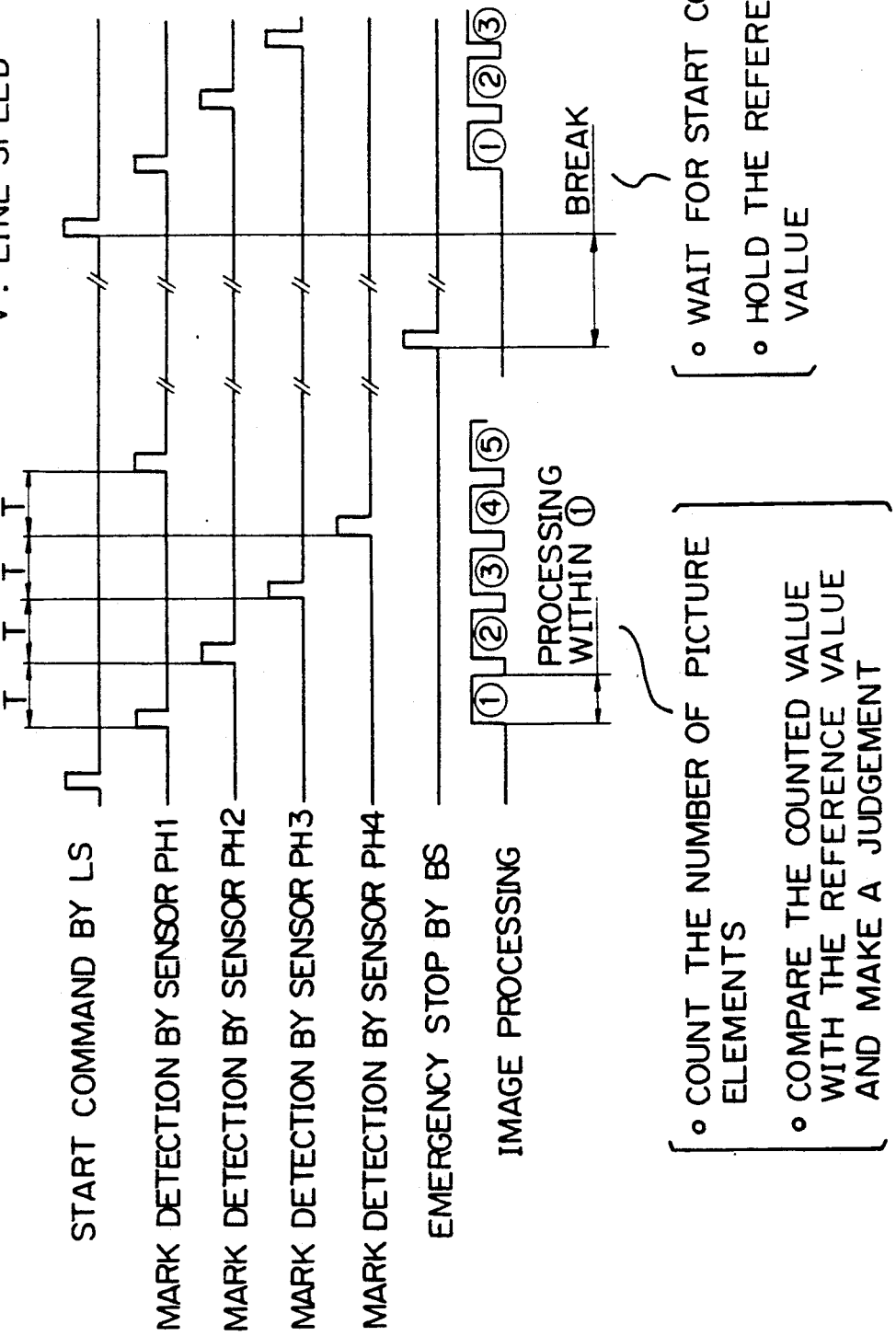
FIG. 7 is a diagram showing the operation timing of a device disclosed in the second embodiment.

In this construction, the surface of the plate with a representative drawing 10 is divided into a plurality of imaging regions (1), (2), (3), (4), (5), - - - , and as shown in FIG. 7, the imaging processing of the respective imaging regions is performed in the order of (1), (2), (3), (4), (5), - - - each time the respective sensors PH1 to PH4 detect the mark 17 in that order.

Reference numeral 18 denotes a fluorescent light used for a light source for the illumination of the plate, and reference character BS denotes a buzzer switch for an emergency stop.

As shown in FIG. 4, analog video signals S1, S2, S3 and S4 are sent from the respective television cameras TV1, TV2, TV3 and TV4 to the image processor 120, and the mark detection signals M1, M2, M3 and M4, start command signal 121 and emergency stop signal 122 are also sent to the image processor 120 from the respective sensors PH1 to PH4, limit switch LS and buzzer switch BS, respectively. Furthermore, a switch SW performs a mode changeover among the modes of area designation, teaching and inspection on receipt of a command signal 123 and also sends the respective mode commands to the image processor 120.

A personal computer 126 having a keyboard provided with the switch SW is connected to the image processor 120, and this personal computer 126 is used for operating the image processor 120, for instance, for the designation of areas, alteration of the reference value, confirmation and so forth. The personal computer 126 is designed to display on a display device 127 the results of the judgement made by the image processor 120 when it makes an judgement that there is a lack of parts.

In addition, a monitor 128 for adjusting the image processing and a video tape recorder (VTR) 129 are also connected to the image processor 120. In the area designating mode, the analog signals carrying the still pictures produced by the respective television cameras TV1 to TV4 are recorded in the video tape recorder (VTR) 129, and the reproduced pictures thereof are designed to be displayed on the monitor 128. In FIG. 4, reference numeral 130 is a power supply unit incorporating a power supply for the television cameras and a high-frequency power supply for the fluorescent light.

The image processor 120 has an area storing section, a binarizing section, a count section, a memory and a judgement section, and is designed to function, by operating the switch SW, to store the areas, to perform teaching on the basis of a complete wire harness G and to inspect the wire harnesses of the subject of the inspection.

The functional sections of the image processor 120 are constituted by appropriate hardware and software.

The area storing section is designed to store the areas (designated by reference numberal 131 in FIG. 5) designated by the personal computer 126 for the respective imaging regions (1), (2), (3), (4), (5), - - - . The details of this area designation will be described. The complete wire harness G is mounted on the plate with a representative drawing 10, and the area designating mode is selected by means of the switch SW, and the plate with a representative drawing 10 is then fed into the inspection line 15. This allows the analog video signals carrying still pictures of the respective imaging regions (1), (2), (3), (4), (5), - - - to be repeatedly recorded by the video tape recorder 129 until the imaging region is changed over from one to another adjacent thereto. When the recording of all of the imaging regions has been completed, the video tape recorder 129 is activated to perform the reproduction of the recorded information so as to display the pictures thereof. The operator puts the video tape recorder 129 in the still picture reproduction mode for each imaging region and conducts an area designating operation while observing the monitor 128.

As shown in FIG. 5, when the still picture of one of the imaging regions is displayed on the monitor 128, the operator produces a small frame 132 in such a manner as to surround the harness part 14b on the screen of the monitor 128 by operating the keyboard of the personal computer 126 and exhibits the same. The area surrounded by this small frame 132 coincides with the area 131, and the operator allows it to be stored in the area storing section of the image processor 120 by operating the keyboard.

Figure 6:
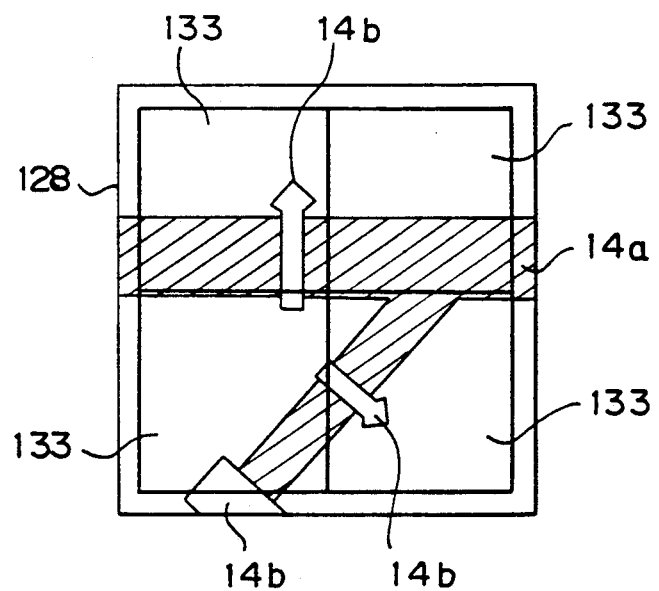

It should be noted that disturbances such as unnecessary shadows in the area 131, characters on the plate with a representative drawing 10 and so forth should be eliminated as far as possible during the above described area designating and storing operations. In addition, in a case where there is no harness parts in a certain imaging region, a message of "no area to be designated" is stored for such an imaging region. The image processor 120 has a default mode as an additional mode in which the imaging region is, as shown in FIG. 6, divided into four sections which are regarded as areas 133, and these areas 133 are designed to be automatically stored when the default mode is selected.

In a case where each area 131 is designed such as to include only one harness part 14b, it is possible to determine which part is missing.

In the teaching and inspection modes, the binarizing section is designed to binarize the received video signals S1 to S4 so as to divide them into the black picture element signals representing the wire harnesses G and 14 and the white picture element signals representing the plate with a representative drawing 10, and these picture element signals are sent to the count section.

In order to shorten the processing time, the image processor 120 is designed such that immediately upon receipt of the video signals of one of the television cameras has been completed, the preparation for the receipt of the video signals of the next-disposed television camera is performed. In addition, in order to adjust the areas to be binarized, targets 124 are provided on the plate with a representative drawing 10 in a widthwise direction at regular intervals (for instance, intervals of 200 mm), and a compensation is conducted in such a manner that the video signals of only the designated area can be binarized by performing a positional slippage compensation that will be described in the latter part of this specification with the targets 124 functioning as the standard thereof.

Figure 5A:
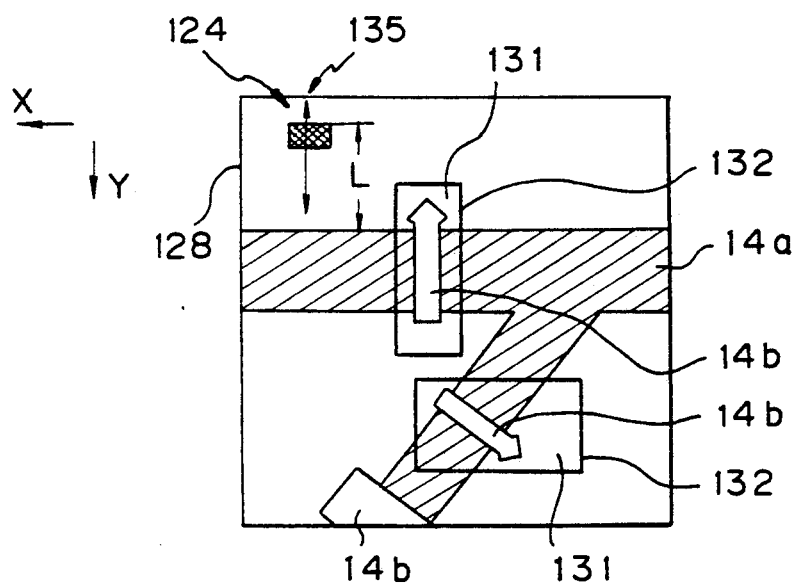
FIGS. 5 and 6 are explanatory diagrams explaining the designation of an area and compensation of a positional slip.
Figure 5B:
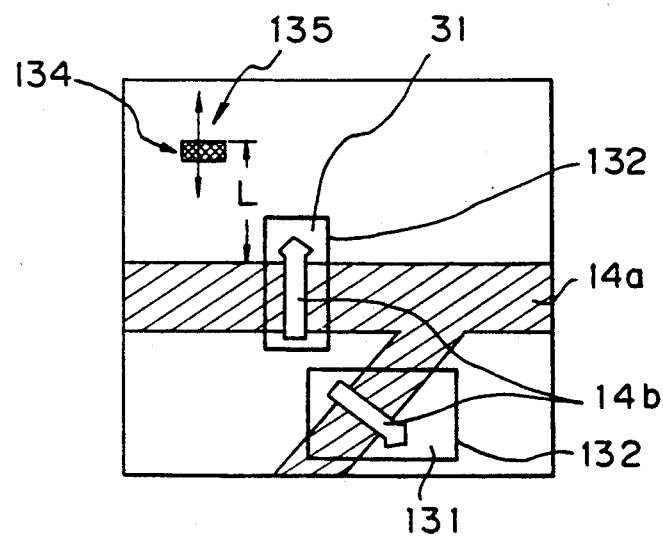

In FIG. 5(A), the distance between the target 124 and the bundled electric wires 14a of the wire harness 14 is maintained constant. This allows the areas 131 to accurately coincide with the inspection targets in a relative way by shifting the inspection window 132 in directions X and Y only by a distance equal to the positional slippage of the target 124 measured via a position compensating window 135, and the state shown in FIG. 5(A) is then changed to the state shown in FIG. 5(B). Therefore, even if a positional slippage occurs in the direction X or Y, or in both, the data indicating that the wire harness parts to be inspected are present are accurately included in the data of the region measured by means of the inspection window 132, and an accurate inspection of the wire harness parts 14b can thus be conducted as shown in FIG. 6.

The count section is designed to count the number of the picture elements of the black picture element signals out of the binarized video signals for each designated area of the respective imaging regions (1), (2), (3), - - -, and is also designed to send the counted values to the memory and the judgement section.

Figure 10:
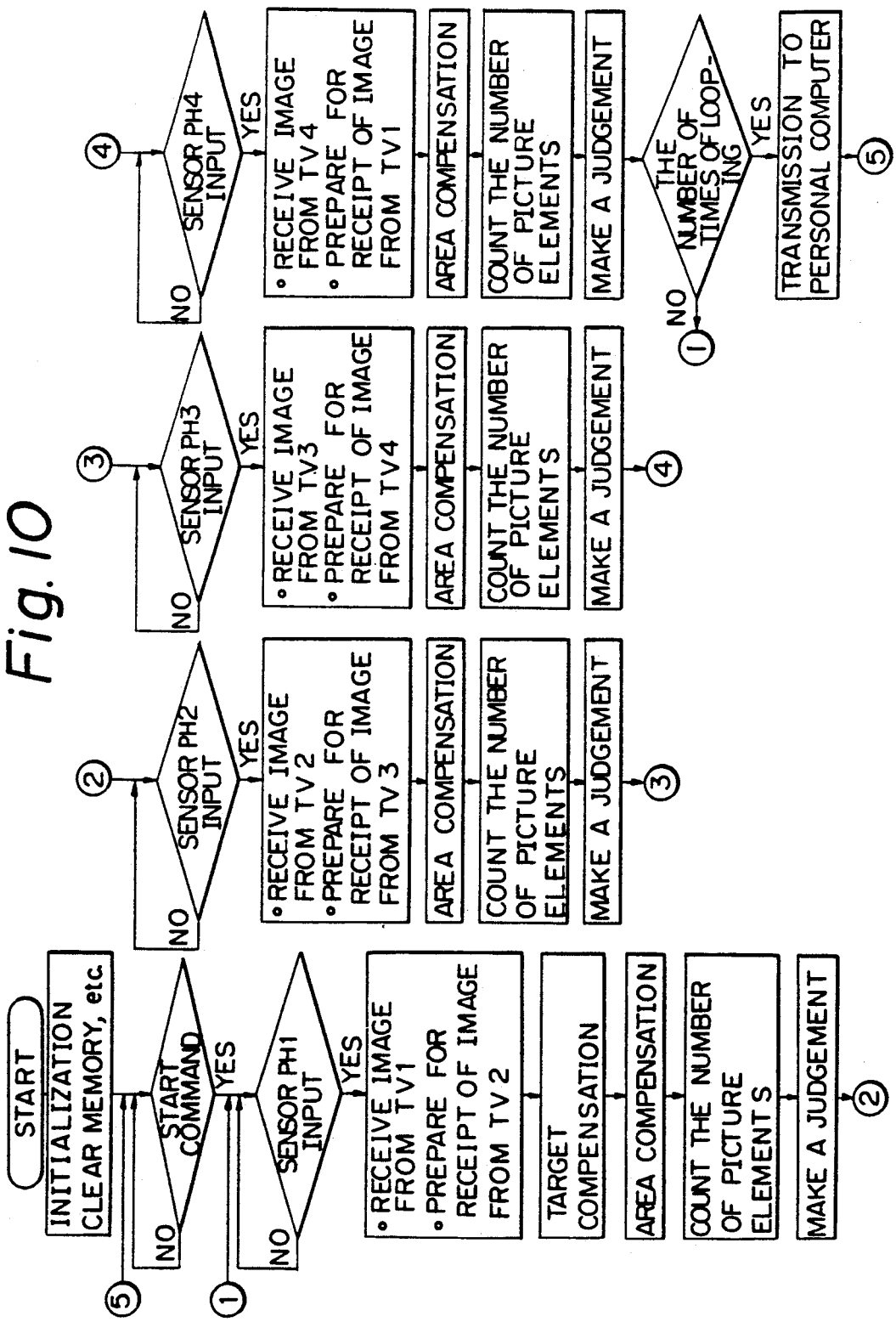
FIG. 10 is a flow chart of an inspection operation

The above described procedure of the inspection is shown in FIG. 10.

Figure 8:
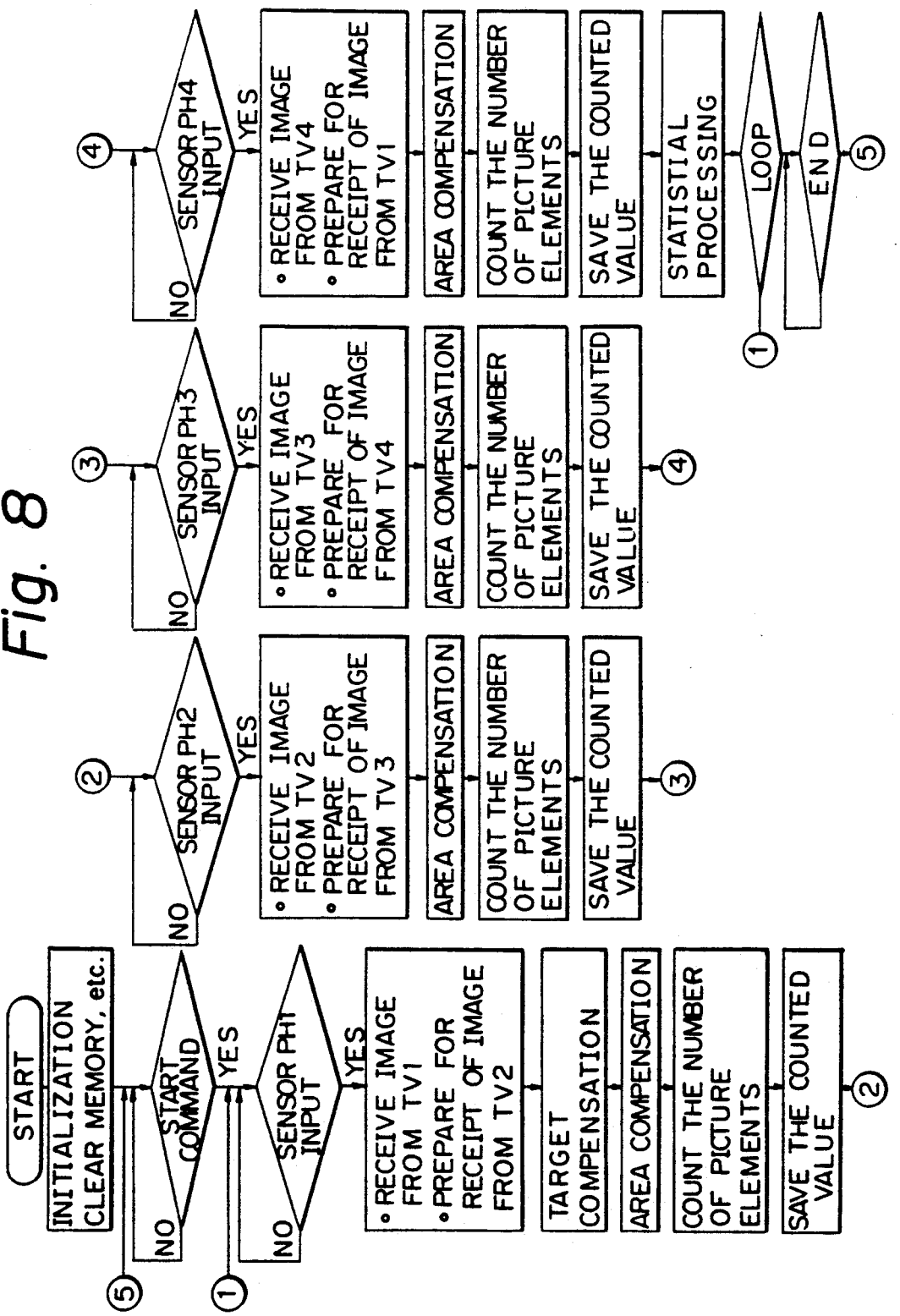
FIG. 8 is a flow chart of a teaching operation.

The memory is, as shown in FIG. 8, designed to save the counted values from the count section in addresses corresponding to the respective imaging regions for the purpose of the statistical processing when the switch SW judges that the image processor is in the teaching mode, and it is also designed to save the results of the calculation conducted in the statistical processing section in the addresses corresponding to the respective imaging regions.

Figure 9:
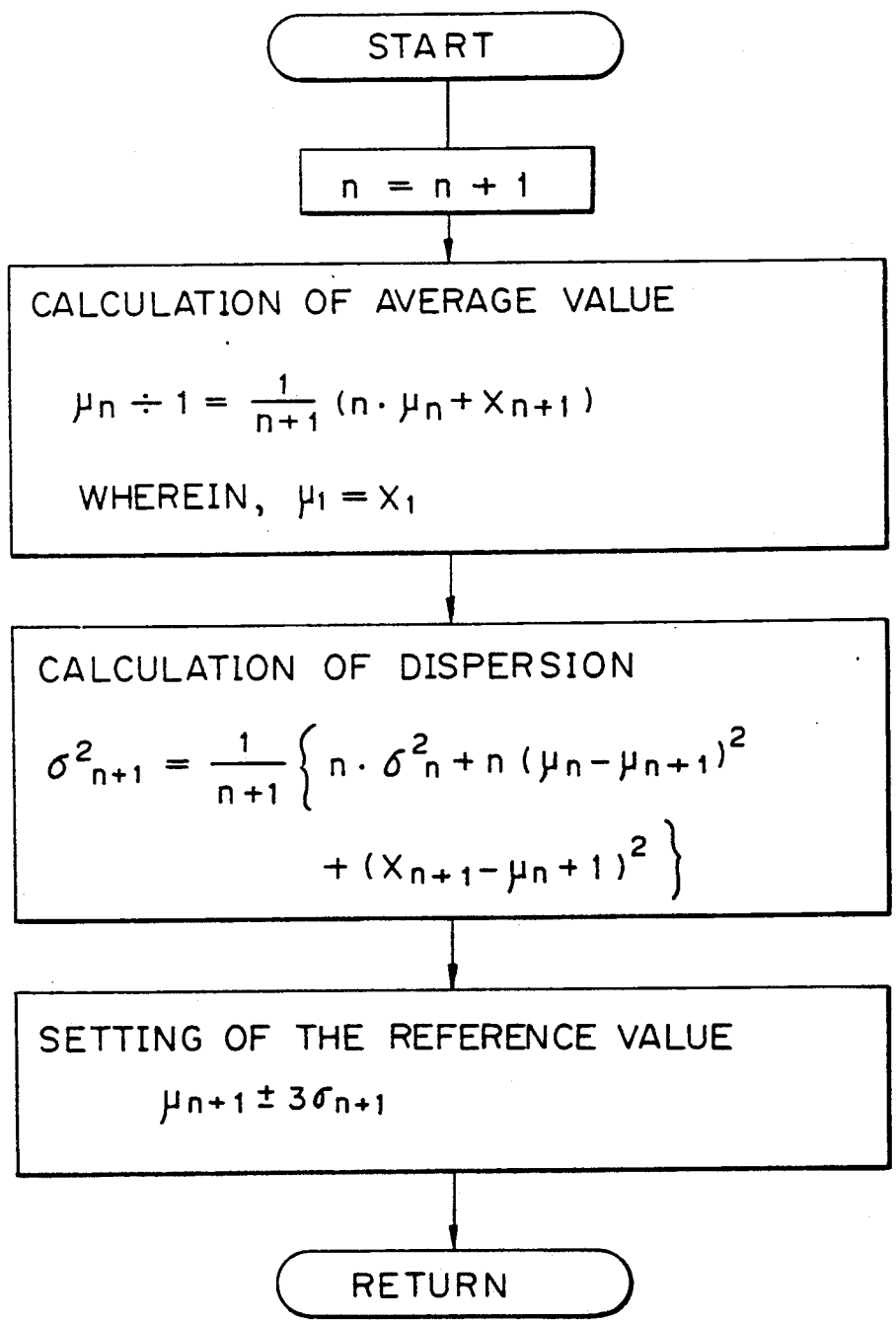
FIG. 9 is a flow chart of a statistical processing operation.

The statistical processing section is designed to receive the counted values from the memory for each imaging region when the switch SW sends the teaching command to the image processor and is also designed to calculate, as shown in FIG. 9, the reference values $\mu \pm 3\sigma$ from the calculations of the average value and standard deviation (dispersion) so as to make them correspond to the memory. In FIG. 9, n is the number of times of sampling, Xn is the counted value of the nth sampling, un is the average value of the last sampling, and un+1 is the average value of the current sampling. The counted value of the first sampling per se is considered to be the average value thereof. $\sigma^2 n$ is the dispersion of the last sampling and $\sigma^2 n+1$ is the dispersion of the current sampling.

Given the inspection mode command from the switch SW, the judgement section compares the counted values from the count section with the reference values stored in the memory for each area and judges whether or not the counted values deviates from the reference values. In a case where the deviation of the counted values from the reference values occurs in any of the areas, the judgement section decides that some harness parts are missing from or that extra parts are mounted on the wire harness and outputs a judgement signal 125 representing a message of "incomplete".

As described above, in the designation of the areas, the complete wire harness G, as a complete sample, is set on the plate with a representative drawing 10, which is fed on the inspection line in order. Every time the sensors PH1 to PH4 detect the mark, the video signals from the television cameras TV1 to TV4 are recorded in the video tape recorder 129 via the image processor 120. Afterwards the operator reproduces the stored images and designates the areas by utilizing personal computer 126 while observing the images.

In the teaching mode, a plurality of complete samples are used. The complete wire harness G is set on the plate with a representative drawing 10, which is fed onto the inspection line in order. The image processor 120 then receives the video signals from the television cameras TV1 to TV4 every time the sensors PH1 to PH4 detect the mark and counts the number of the black picture elements for each area. The image processor 120 takes the counted values as the surface area of each area and stores (teaches) these counted values as the reference values. The operator repeats this operation and allows the image processor to perform the statistical processing so as to automatically renew the reference values.

In the inspection mode, the wire harness 14 assembled on the plate with a representative drawing is fed into the inspection line 15, and the image processor 120 receives the video signals every time the time sensors PH1 to PH4 detect the mark without altering the fields of the respective television cameras TV1 to TV4. The image processor 120 then counts the black picture elements for each area and compares the counted values with the reference values for the number of the black picture elements that are statistically processed for each area so as to judge whether or not the wire harness is complete.

When the wire harness is judged as being incomplete, it is repaired by the operator.

In this embodiment, a lack of parts is judged by simply comparing the binarized areas, i.e. comparing the number of the black picture elements representing the complete wire harness G with the number of the black picture elements representing the wire harness 14 which is the subject of the inspection. Therefore, the image processor 120 only conducts simple processing jobs such as binarization, count, comparison and so forth, and this allows the image processor 120 to perform their duties at an extremely high speed, thus making it possible to move the plate with a representative drawing 10 at a high speed, thus improving the efficiency of the inspection. This allows the inspection to be conducted at an online speed.

This embodiment may be used to inspect for a lack of parts in inspection articles other than wire harnesses. In such a case, no matter how complicated the configurations of the inspection articles are or no matter how difficult it is to detect individual parts of the articles, there will be no difficulty in performing an inspection for a lack of parts since the judgement of a lack of parts is made by optionally designating areas so as to compare the surface areas of the so designated areas. In addition, the fields of the television cameras may be adjusted depending on the accuracy of the inspection, and therefore one or more television cameras may be used depending on the required accuracy of the inspection and the size of the inspection articles.

Referring to FIG. 11, a third embodiment of the present invention will now be described.

FIGS. 11 (A), (B) show, respectively, the images corresponding to one image plane that is read out of the memory in the image processor 32. In the same figure, reference numeral 14' denotes the image of a wire harness representing the image of the wire harness 14, and reference numeral 210' denotes the image of a position compensating mark representing the image of a position compensating mark 210. A position compensating window 220 shown by reference arrow 220 and an inspection window 221 shown as a rectangular region surrounded by a dotted line are provided in this image. The window means an inspection region of any configuration (of a linear or circular configuration) provided at a position where an inspection is desired to be conducted, and in a case where a signal is read out of the memory region in which the window is provided, the image to be obtained will be equal to those shown in FIG. 11.

The position compensating window 220 is used to detect the position of the position compensating mark 210 from the image 210' of the position compensating mark. In addition, the inspection window 221 is used to detect the configuration and position of the wire harness 14 by processing the data present in the region surrounded thereby.

In this embodiment, the video signals obtained by the industrial television cameras 17 begin to be received in the image processor 32 from the moment when a photo switch detects a reflective tape while the plate with a representative drawing 10 is being fed in the direction X. This allows an image processing operation to be started without any deviation in the direction X.

Figure 11A:
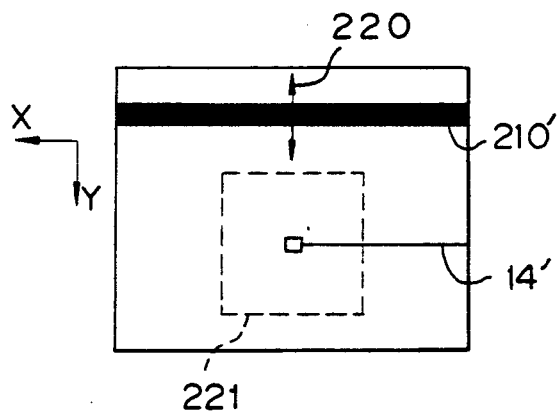
FIG. 11 is an explanatory diagram showing a third embodiment of the present invention, in which the state of an image plane displayed for the purpose of inspection is shown.
Figure 11B:
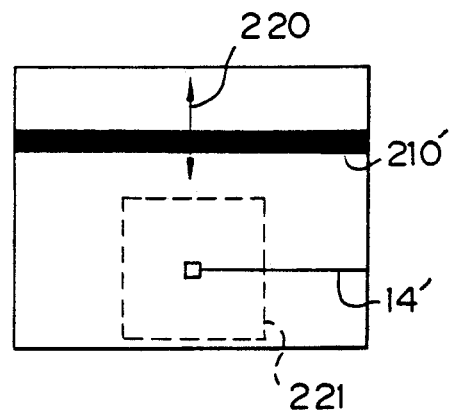

During the image processing by the image processor 32, when it is judged that the position of the image 210' of the position compensating mark which is adapted to flow in such a manner as to intersect the position compensating window 220 is caused to displace downwardly from the state shown in FIG. 11(A) to the state shown in FIG. 11(B) in the image plane due to the displacement of the position compensating mark 210 resulting from the slippage of the position of the plate with a representative drawing 10, the inspection window 221 is automatically caused to slip downwardly by a distance equal to the slippage of the image 210' of the position compensating mark from the state shown in FIG. 11(A) to the state shown in FIG.(B). As a result, therefore, even when the slippage occurs in the direction Y, the data representing the image 14' of the wire harness to be inspected is ensured to be present in the data in the region encompassed by the inspection window 221, thus making it possible to accurately conduct an inspection of the wire hardness.

In the above embodiment, although the slippage in the direction X is dealt with by providing the reflective tape and the photo switch, an X direction compensating mark may be provided at the left-hand end of the plate with a representative drawing 10 in such a manner as to be allowed to enter the field of the television camera 17 so as to deal with the slippage in the direction X by the action of signal processing.

This embodiment may be applied to the inspection of long articles other than wire harnesses.

According to this embodiment, since the positional displacement of the subject of the inspection is designed to be detected by the position compensating mark and the position compensating window, and since the inspection window is designed to be displaced in accordance with the displacement of the subject of the inspection, in a case where long articles are inspected by utilizing an image processing method, no accurate positioning device needs to be provided. Moreover, the positional slippage can be automatically detected in the field of the television camera, and the compensation of the inspection field can also be automatically conducted, whereby a highly reliable image processing inspection can be accomplished.

Figure 12:
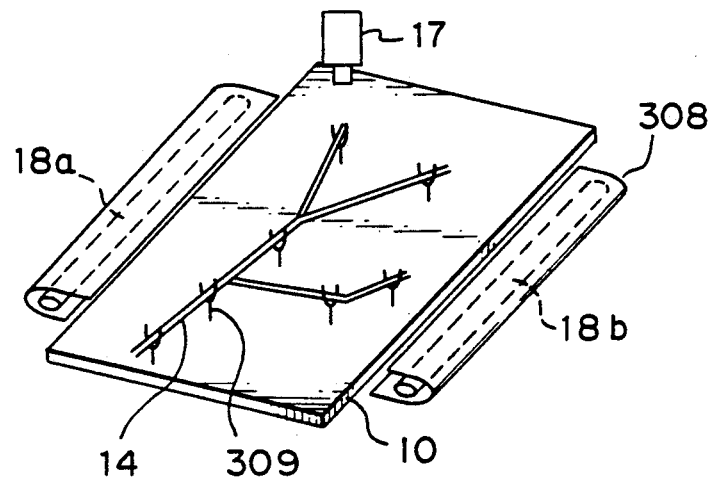
FIG. 12 is an explanatory diagram showing a fourth embodiment of the present invention.
Figure 13:
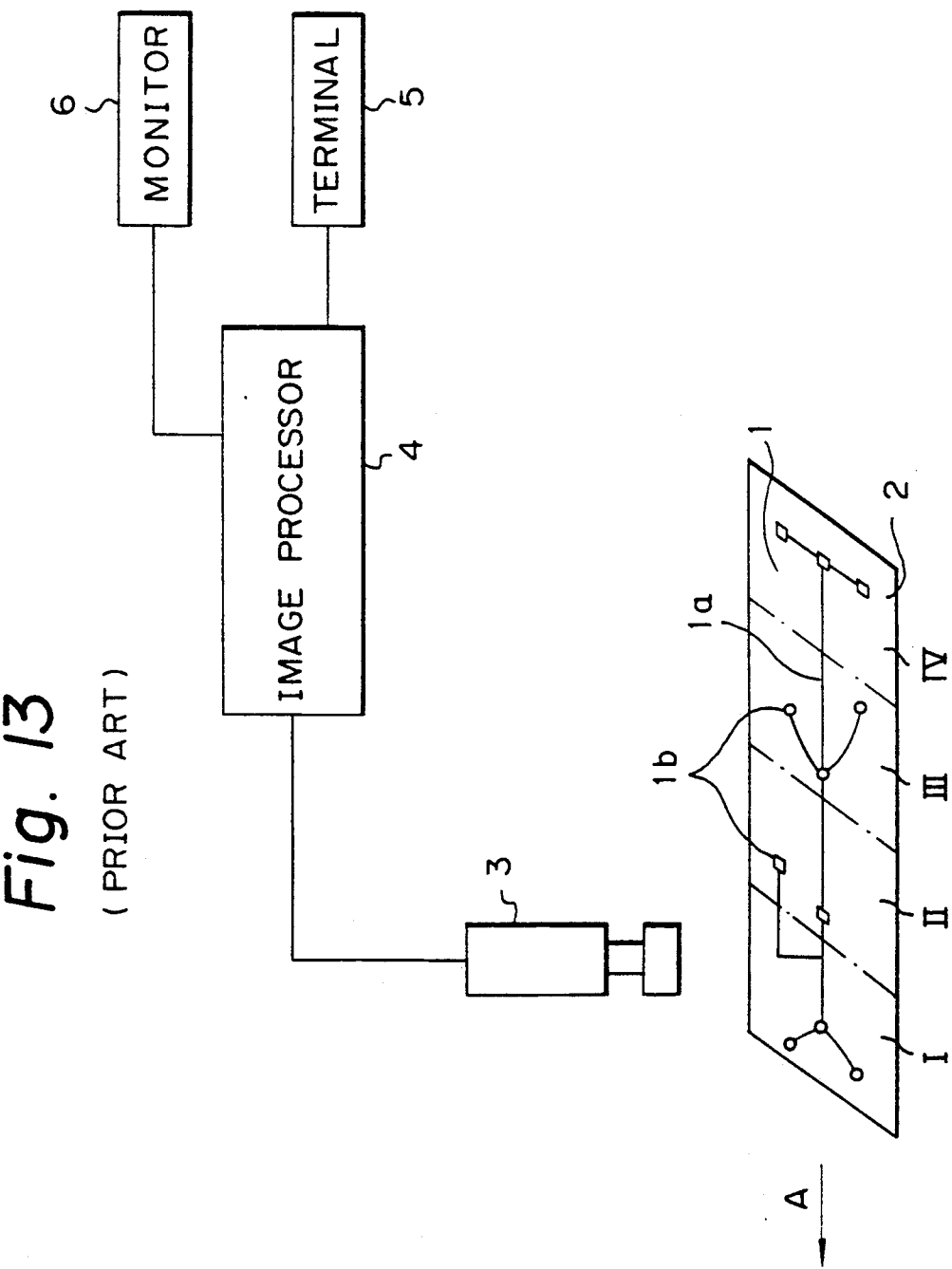
FIG. 13 is a schematic diagram showing the constitution of a prior art image processor for detecting incomplete articles.

Referring to FIG. 12, a fourth embodiment of the present invention will now be described. FIG. 12 is a perspective view of a dummy transmitted light type illuminating device according to the fourth embodiment.

In FIG. 12, stick-like hooded fluorescent lights 18a, 18b are provided on the sides of a white plate 10 and are disposed as close to the surface thereof as possible so that the white plate can be illuminated by the fluorescent lights in a substantially parallel direction from the sides thereof. Hoods 308 are provided on the respective fluorescent lights 18a, 18b lest the light thereof does not directly enter the television camera 17. Stick-like supporting members 309 having a U-shaped tip are provided on the white plate 10. The image processor of this embodiment is intended to inspect the subject 14 which is branched like wire harnesses for use in automobiles by utilizing an image processing method. Due to this, a number of supporting members 309 are used to support the individual parts of the subject 14 on the respective U-shaped portions thereof, and the subject 14 can be thereby supported at a position above the hoods 308 in such a manner as to be suspended above the white plate 10. The hood 308 is constructed such that the upper portion thereof is in parallel to the white board 10 and that the imaginary line extending from the upper portion reaches the bottom of the U-shaped portions of the respective supporting members 309.

For the purpose of image processing, as shown in FIG. 1, the television camera 17 is placed above the white plate 10. The image of the subject 14 of the inspection is produced from the front thereof, and the signals are sent to the image processor 32. A monitor 33 is connected to the image processor 32 so as to allow the operator to observe the reproduced image thereon. A high-frequency power source is used as a power source for the fluorescent lights 18a, 18b in order to reduce flickering.

In the above described embodiment, since the light of the fluorescent lights 18a, 18b is designed to illuminate the white plate 10 from the sides thereof in a direction that is extremely parallel to the white plate 10, even when characters or patterns are present on the surface of the white plate 10, it is able to be brightly and uniformly illuminated without interference from the characters or patterns. In addition, it is possible to make the shadows of the supporting members 309 and the subject 14 of the inspection disappear from the surface of the white plate 10. Moreover, in this embodiment the subject 14 of the inspection is not illuminated from the front thereof, and this allows the white plate 10 to function as a bright background with respect to the subject 14, whereby an effect almost similar to that obtained by utilizing transmitted light can be obtained. Thus, the television camera TV4 is able to solely produce the image of the subject 14 of the inspection which clearly stands in silhouette against its bright background.

Any method of image processing may be employed. The following is an example in which an inspection is conducted for a lack of the harness parts such as tubes, crampers, grommets, protecters, taping and so forth. The image of a complete article is input from the television camera 17, and the number of the black picture elements is counted after the binarization of white and black has been conducted, and the counted values are stored as the surface area of the complete article. Following this, the image of the subject of an inspection is input from the television camera 17, and the binarization is conducted in the same manner as in the case of the complete article. The number of the black picture elements is counted, and the difference in the counted values of the relevant two articles is calculated. When the resulting difference fails to fall within the range of the scatter of the complete article, the inspection article is then judged as being incomplete.

A base plate to be used may be of any of the colors including yellow, gray and so forth except black, but whitish colors should preferably be used so that the silhouette of the subject 14 of the inspection can easily be distinguished from the base plate.

In the inspection line, the television camera 17 and the fluorescent lights 18a, 18b are normally fixed, while the white plate 10 is constructed such that it is caused to travel between the fluorescent lights 18a, 18b under the television camera 17 by means of a carrier device. The fluorescent lights 18a, 18b may be fixed to the white plate 10.

With this embodiment, illumination similar to that obtained by utilizing transmitted light can be realized by illuminating the base plate which is apart from the subject of the inspection from the sides thereof in a substantially parallel direction.

What is claimed is:

1. An apparatus for inspecting a candidate article for incompleteness, said apparatus comprising:
    a support device for supporting a subject article and having a position compensating mark disposed thereon;
    a camera device disposed above the support device for viewing the subject article and for outputting corresponding video signals;
    window designation means for designating an area of inspection of the subject article and including a display device for displaying the video signals output by said camera device; and,
    image processing means for operating in either of a learning mode and an inspection mode;
    wherein, in the learning mode, the subject article is a representative complete article and said image processor means includes
        (1) means for binarizing the video signals output by said camera device from within the area of inspection designated by said window designation means to obtain binarized video signals,
        (2) means for processing the binarized video signals to obtain a reference value, and
        (3) means for determining a relative position between the position compensating mark and the area of inspection designated by said window designation means;
    wherein, in the inspection mode, the subject article is the candidate article and said image processing means includes
        (1) means for determining the area of inspection of the candidate article according to the relative position of the position compensating mark,
        (2) means for binarizing the video signals output by said camera device from within the area of inspection designated by said window designation means to obtain binarized video signals,
        (3) means for processing the thus binarized video signals to obtain a measurement value, and
        (4) means for comparing the reference value obtained in the learning mode and the measurement value to determine that the candidate article is incomplete when a difference therebetween exceeds a threshold value.

2. An apparatus as recited in claim 1,
    wherein, in the learning mode, said image processing means further includes means for counting a value of the binarized video signals and for computing and storing an average value and a standard deviation value of plural counted values of the binarized video signals, wherein the reference value is the average value, and
    wherein, in the inspection mode, the threshold value is three times the standard deviation value.

3. An apparatus as recited in claim 1, further comprising:
    support members disposed on the surface of said support device for supporting the candidate article at a distance above the surface of said support device;
    illuminating members disposed at opposite sides of said support device, each of said illuminating members including a light source member and a hood member surrounding the light source member, the hood member directing light emitted by the light source member in a direction above and parallel to the surface of said support device to impinge on the candidate article supported above the surface of said support device.

4. An apparatus as recited in claim 2, further comprising:
    support members disposed on the surface of said support device for supporting the candidate article at a distance above the surface of said support device;

illuminating members disposed at opposite sides of said support device, each of said illuminating members including a light source member and a hood member surrounding the light source member, the hood member directing light emitted by the light source member in a direction above and parallel to the surface of said support device to impinge on the candidate article supported above the surface of said support device.

* * * * *